March 15, 1960     F. A. HANSEN     2,928,413
RELIEF VALVE

Filed Oct. 20, 1954     2 Sheets-Sheet 1

INVENTOR.
FRANKLIN A. HANSEN.
BY
ATTORNEY

March 15, 1960 F. A. HANSEN 2,928,413
RELIEF VALVE
Filed Oct. 20, 1954 2 Sheets-Sheet 2

INVENTOR.
FRANKLIN A. HANSEN.
BY
ATTORNEY

United States Patent Office

2,928,413
Patented Mar. 15, 1960

2,928,413
RELIEF VALVE

Franklin A. Hansen, Raytown, Mo., assignor to Black, Sivalls & Bryson, Inc., Kansas City, Mo., a corporation of Delaware Application October 20, 1954, Serial No. 463,568

6 Claims. (Cl. 137—493.9)

The present invention relates to valves for relieving internal pressures and vacuums that tend to occur in storage tanks. These valves operate as safety relief devices to protect storage tanks from damage caused by excessive pressures and vacuums and are utilized to conserve vapors of volatile liquids which would be lost if stored in tanks open to the atmosphere.

Prior devices of this type have a tendency to leak and chatter when the predetermined opening pressure of the valve is approached and require extensive counter-weighting to obtain pressure relief at a minimum predetermined tank pressure. These prior devices do not have a full relieving capacity upon initial opening but require additional pressure for complete opening. After complete opening, these valves also have a tendency to remain open until the tank pressure drops far below the predetermined opening pressure resulting in the loss of valuable vapors from the storage tank.

Therefore, the primary object of the present invention is to provide an improved device which will relieve pressures and vacuums in tanks at predetermined pressure settings. Further objects of the present invention are to provide a pressure and vacuum relieving device which remains sealed by positive pressure until the predetermined relieving pressure is reached in the tank; to provide a pressure and vacuum relieving device which will afford maximum pressure relief upon initial opening; to provide a pressure and vacuum relieving device which after opening will close and seal when the pressure in the tank drops below the predetermined opening pressure; and to provide a pressure and vacuum relieving device which has a single sealing membrane effecting a positive seal for both pressure and vacuum conditions.

In accomplishing these and other objects of the invention, I have provided improved details of structure, the preferred form of which is illustrated in the accompaning drawings wherein.

Figure 1:
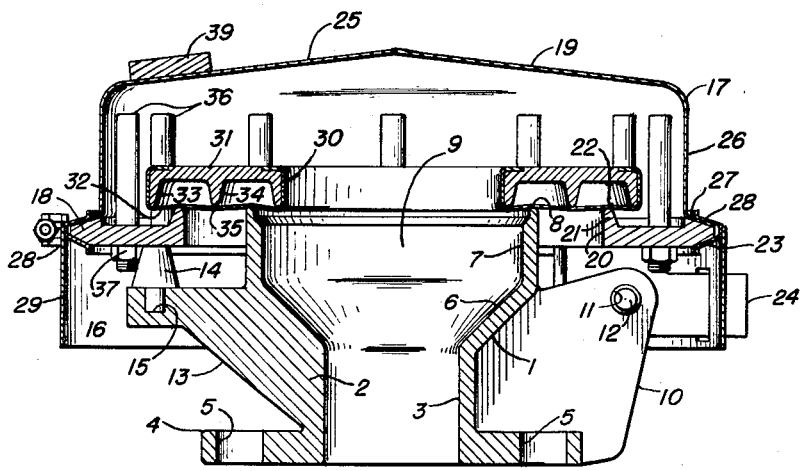
Fig. 1 is a full sectional view taken along a diameter of my improved pressure and vacuum relieving device illustrating both pressure and vacuum relieving means in closed position.

Referring more in detail to the drawings:

1 designates my preferred form of pressure and vacuum relief valve which includes a body 2, having an annular wall 3 terminating at its lower edge in a flange 4 which has holes 5 for bolts (not shown) to provide connection to a vessel on which the relief valve is to be installed. The upper portion of the wall 3 terminates in an outwardly flaring portion 6 having an upstanding annular rib 7 forming a circular seat 8 encircling the relief outlet opening 9 through the valve body 2.

Formed integrally with the valve body 2 are two body hinge lugs 10 extending outwardly from the annular wall 3 in parallel spaced relationship to each other, each having a hole 11 drilled near its upper and outer extremity to receive hinge pins 12.

Diametrically opposite the body hinge lugs 10, a single bumper supporting bracket 13 extends outwardly from the valve body 2. A resilient bumper 14 or a plurality of bumpers are installed in the recess 15 of the bumper receiving member 16 which is formed as an integral portion of the bumper supporting bracket 13 at its outer extremity. As may be clearly seen from Figs. 1, 2 and 3 the portion of the bumper 14 which extends above the recess 15 is frusto-conical in shape to provide maximum resilience with minimum deformation.

A cover 17 composed of a cover base 18 and a bonnet 19 is positioned over the relief opening 9. The cover base 18 is spaced radially from the circular seat 8 and comprises a substantially flat annular ring portion 20 having an upstanding flange 21 around its inner periphery providing a seat 22 and a tapered section 23 around its outer periphery providing an anchoring edge for the bonnet 19. Depending from the under side of the ring portion 20 of the cover base 18 are two cover hinge lugs 24 which are parallel to and in close spaced relationship with the body hinge lugs 10, each of the cover hinge lugs 24 being exterior of its corresponding body hinge lug 10. Holes (not shown) are drilled in the cover hinge lugs 24 to receive the hinge pins 12. Thus, the cover 17 is fixed in a pivoting relationship with the valve body 2 by the hinge pins 12.

The bonnet 19 has a central top portion 25 which is slightly conical in shape to provide structural rigidity and allow the bonnet 19 to be constructed of a relatively thin, light-weight material. Depending from this central portion 25 is an annular wall 26 terminating in an outwardly and downwardly flared annular flange 27 which is held on the tapered portion 23 of the cover base 18 by the action of an annular quick-opening wedge clamp 28. The clamp 28 is shown supporting a downwardly depending cylindrical weather hood 29 which provides protection for the valve seats 8 and 22 and the valve plug 30 from the adverse effects of weather.

The valve plug 30 is composed of a flat annular ring portion 31 and a resilient diaphragm 32 covering the inner and outer marginal edges of the ring portion 31 and extending across the flanges 33 depending from the ring portion 31. The drawings illustrate a valve plug 30 having three depending flanges but, it should be understood that the inner or middle depending flange 34 may not be necessary in all cases. In the present design this depending flange 34 is included to reinforce the diaphragm 32, protecting it from wrinkling and puckering when in use. In many relatively small size applications of the present invention this inner flange 34 may be omitted without affecting the sealing of the valve plug 30.

Figure 4:
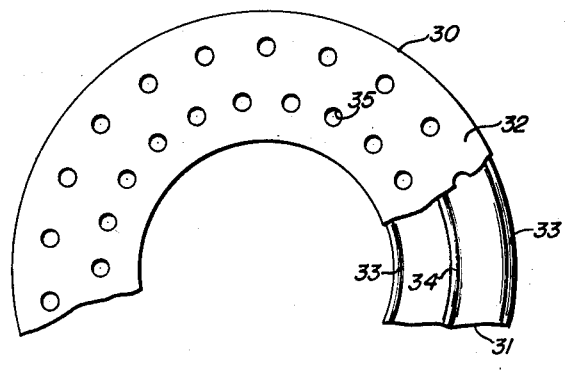
Fig. 4 is a partial view of the underside of the floating annular plug ring of my improved device.

As shown in Fig. 4 the diaphragm 32 has apertures 35 positioned to lie between the depending flanges 33 and the circular seats 8 and 22 when the valve plug 30 is in closed position as shown in Fig. 1. The vertical risers 36 are secured to the cover base 18 by nuts 37 or any other suitable manner. These risers 36 serve to position the valve plug 30 over the relieving area 38 to assure proper transverse positioning of the valve plug 30 on or above the seats 8 and 22.

It should be noted that the cover base 18 is hinged to the valve body 2 on one side and supported by the bumper 14 on the other side in a position causing the seats 8 and 22 to lie substantially in a horizontal plane, Minor misalignments of these two seats will not affect the seating since the diaphragm 32 has sufficient resilience for positive seating under such conditions.

The proper opening pressure may be assured by the cover weights 39, the cover counter-weights 40, the valve plug weights 41 or any combination of these weights, each positioned as shown in the drawings and suitably secured. The cover counter-weights 40 are not needed except for installations requiring pressure relieving at minute pressures. Thus, as a result of the simple, light-weight construction of the present device, pressure relieving at small pressure differentials may be obtained without counter-weights.

In operation, the present invention as shown in Fig. 1 illustrates the valve plug 30 positioned across the relief area 38 blocking passage of vapors and air both into and out of the valve 1. The valve 1 will assume such a position when exposed to pressures between the predetermined pressure and vacuum relieving pressure settings. The valve plug 30 is held firmly on the seats 8 and 22 by the pressure differential in the two relieving areas 9 and 38 when the pressure in the valve 1 is above atmospheric pressure. The valve plug diaphragm 32 is positively held on the seats 8 and 22 when the pressure within the valve is below atmospheric and above the predetermined vacuum relieving pressure. This positive seating is accomplished since atmospheric pressure is asserted on the interior of the diaphragm 32 through the appertures 35 causing a pressure differential across the inner and outer marginal edges of the diaphragm 32 where the exterior is exposed to the sub-atmospheric pressure within the valve body 2.

Figure 2:
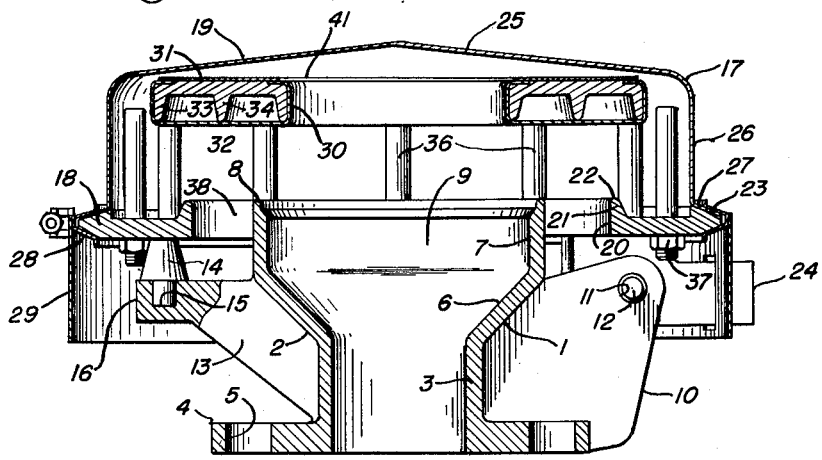
Fig. 2 is a similar full sectional view of my improved pressure and vacuum relieving device illustrating the position of the device during vacuum relief.

The valve 1 of the present invention shown in Fig. 2 is in a vacuum relieving position. As shown the pressure differential across the valve plug 30 has exceeded the predetermined vacuum relief setting and forced the valve plug 30 up from the seats 8 and 22 allowing pressure to enter into the valve body 2 through the relief area 38 and into the relief opening 9, relieving the vessel being protected. It is obvious that the addition of plug weights 41 to the valve plug 30 will increase the pressure differential necessary for vacuum relief. The desired weights may easily be calculated for any desired pressure differential. Also, when the existing pressure differential falls before the predetermined pressure differential for vacuum relief, the valve plug 30 will return by its own weight to its positive seating position across the relief area 38, being guided in its travel by the vertical risers 36 to provide a uniform seating after every relief action.

Figure 3:
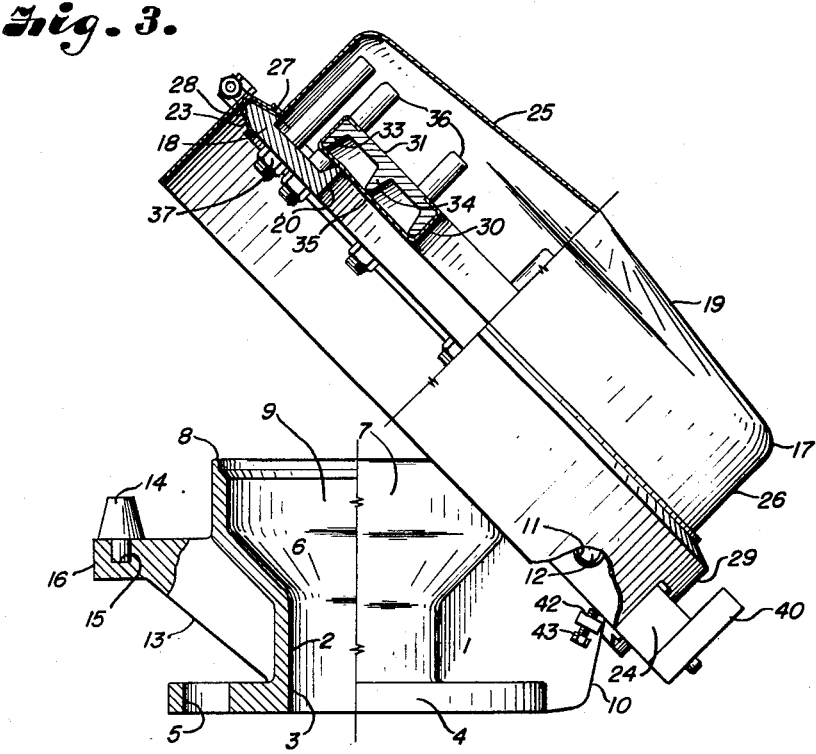
Fig. 3 is a similar full sectional view of my improved pressure and vacuum relieving device illustrating the position of the device during pressure relief.

As shown in Fig. 3 a pressure above the predetermined relieving pressure within the device will cause the cover 17 and the valve plug 30 to be lifted from the seat 8, allowing the pressure within the valve body 2 to be vented to atmosphere until such pressure falls below the predetermined relieving pressure. Attached to the body hinge lugs 10 or integral therewith is a stop lug 42 and an adjustment screw 43. The purpose of this lug 42 and screw 43 is to make contact with the cover hinge lugs 24 when the cover 17 has pivoted to an open position of maximum relieving capacity. Also, the lug 42 will allow quick opening of the cover 17 giving large relief capacity immediately without allowing opening to a past-center position from which closing of the cover 17 could not take place. When the pressure has been sufficiently relieved so that it falls below the predetermined relieving pressure then the cover 17 and the valve plug 30 will drop back into seated position. The resilient bumper 14 absorbs the jar of this fall and assures proper alignment of the seats 8 and 22.

Thus, it may be seen from the foregoing that I have provided an improved relief valve having a single relief passageway and so constructed to afford maximum relief capacity without leaking or chattering with a minimum loss of valuable tank vapors.

What I claim and desire to secure by Letters Patent is:

1. A pressure and vacuum relief valve including, a valve body having a circumferential seat, a valve cover adapted to retain gases under pressure up to a predetermined amount, a cover base attached to said valve cover, said cover base having a circumferential seat spaced substantially radially outward from said seat on said valve body to provide an annular vacuum relief opening therebetween, means permitting opening of said cover for release of pressure, and an annular valve plug closing said relief opening when said plug is in seated position and having substantially its entire effective surface overlying the opening between said seats, said annular valve plug being in the form of an inverted channel member having a flexible diaphragm covering its lower surface and cooperating with said valve seats, said flexible diaphragm containing apertures which are positioned in said diaphragm to lie between said seats on said valve body and said cover base when said annular valve plug is seated on said seats.

2. A pressure and vacuum relief valve including, a valve body having a circumferential valve seat encircling a relief opening in said body, a cover for said body having a cover base, means securing said cover base to said body for movement of said cover base relative to said body, said cover base having an upstanding circumferential valve seat in spaced relationship to said circumferential valve seat of said body providing an annular passageway therebetween, an annular plug ring having flanges depending from its internal and external marginal edges, a resilient seating member carried by said plug ring across said depending flanges to provide seating of said plug ring on both of said circumferential valve seats, said annular plug ring being slidably mounted for movement to and from said seated position independent of the movement of said cover and said cover base to provide vacuum relief and movable to and from said seated position with the movement of said cover and said cover base to provide pressure relief.

3. A pressure and vacuum relief valve including a valve body having a circumferential valve seat encircling a relief opening in said body, a cover for said body, a cover base, clamping means securing said cover to said cover base, means securing said cover base and said cover to said body for movement of said cover relative to said body, an upstanding flange on said cover base forming a circumferential valve seat spaced radially in the same plane as said circumferential valve seat on said body and forming an annular passageway therebetween, an annular plug ring having flanges depending from its internal and external periphery, a resilient seating member carried by said plug ring across said depending flanges, said plug ring positioned in covering relationship to said annular passageway with said seating member seated on both circumferential valve seats, said plug ring being movable to and from said circumferential valve seat independent of the movement of said cover, and apertures in said seating member to provide a positive force for seating said seating member on said circumferential valve seats when an internal vacuum in said valve body of a magnitude less than the predetermined vacuum relief setting occurs.

4. A pressure vacuum relief valve including, a valve body having a circumferential seat, a valve cover adapted to retain gases under pressure up to a predetermined amount, a cover base attached to said valve cover, said cover base having a circumferential seat spaced substantially radially outward from said seat on said valve body to provide an annular vacuum relief opening therebetween, means permitting opening of said cover for release of pressure, and an annular valve plug closing said relief opening when said plug is in seated position and having substantially its entire effective surface overlying the opening between said seats, said annular valve plug being in the form of an inverted channel member having depending annular flanges and a flexible diaphragm extending across the lower edge of the flanges for contacting said valve seats in sealing engagement when said flexible valve plug is in seated position.

5. A pressure and vacuum relief valve including, a valve body having a circumferential valve seat encircling a relief opening in said body, a cover for said body having a cover base, means securing said cover base to said body for movement of said cover base relative to said body, said cover base having an upstanding circumferential valve seat in spaced relationship to said circumferential valve seat of said body providing an annular passageway therebetween, an annular plug ring having flanges depending from its internal and external marginal edges and a flange depending from its central portion positioned between said flanges depending from its internal and external marginal edges, a resilient seating membrane carried by said plug ring and positioned across the lower edges of said depending flanges to provide seating of said plug ring on said circumferential valve seats, said annular plug ring being slidably mounted for movement to and from said seated position independent of the movement of said cover and said cover base to provide vacuum relief and movable to and from said seated position with the movement of said cover and said cover base to provide pressure relief.

6. A pressure vacuum relief valve including, a valve body having a circumferential seat, a valve cover adapted to retain gases under pressure up to a predetermined amount, a cover base attached to said valve cover, said cover base having a circumferential seat spaced substantially radially outward from said seat on said valve body to provide an annular vacuum relief opening therebetween, means permitting opening of said cover for release of pressure, adjustable stop means for limiting the opening movement of said cover relative to said body, and an annular valve plug closing said relief opening when said plug is in seated position and having substantially its entire effective surface overlying the opening between said seats.

References Cited in the file of this patent

UNITED STATES PATENTS

| | | |
|---|---|---|
| 1,578,766 | Schwemlein | Mar. 30, 1926 |
| 1,585,512 | Roades | May 18, 1926 |
| 1,664,963 | Atwell | Apr. 3, 1928 |
| 1,695,248 | Crompton | Dec. 11, 1928 |
| 2,317,923 | Lebo | Apr. 27, 1943 |
| 2,328,598 | Anderson | Sept. 7, 1943 |
| 2,388,395 | Duggan | Nov. 6, 1945 |

FOREIGN PATENTS

| | | |
|---|---|---|
| 744,003 | France | Jan. 16, 1933 |